United States Patent [19]

Alberts et al.

[11] 3,855,353

[45] Dec. 17, 1974

[54] GRAFT POLYMERS BASED ON ETHYLENE COPOLYMERS

[75] Inventors: Heinrich Alberts, Cologne; Herbert Bartl, Odenthal-Hahnenberg; Rainer Kuhn, Berg. Gladbach, all of Germany

[73] Assignee: Bayer Aktiengesellschaft, Leverkusen, Germany

[22] Filed: Mar. 26, 1973

[21] Appl. No.: 344,544

[30] Foreign Application Priority Data
Mar. 30, 1972 Germany.............................. 2215588

[52] U.S. Cl............................................ 260/878 R
[51] Int. Cl. .......................................... C08f 15/00
[58] Field of Search ................................ 260/878 R

[56] References Cited
UNITED STATES PATENTS
3,773,699   11/1973   Bergmeister et al............. 260/878 R FOREIGN PATENTS OR APPLICATIONS
917,499   2/1963   Great Britain................. 260/878 R Primary Examiner—Joseph L. Schofer
Assistant Examiner—A. Holler
Attorney, Agent, or Firm—Connolly and Hutz

[57] ABSTRACT

Graft polymers are obtained by graft polymerization of 10 to 95% by weight of a monomer mixture consisting of 15 to 80% by weight of (meth)acrylonitrile, 10 to 70% by weight of at least one aromatic vinyl compound, 5 to 40% by weight of at least one monoolefine and optionally further monomers on 5 to 90% by weight of an ethylene-vinyl ester copolymer having a vinyl ester content of 5 to 75% by weight in the presence of a polymerization catalyst in homogeneous or heterogeneous phase at temperatures of from −20°C and under pressure of up to 500 atm.

11 Claims, No Drawings

GRAFT POLYMERS BASED ON ETHYLENE COPOLYMERS

This invention relates to graft polymers consisting of a mixture of (meth) acrylonitrile, aromatic monovinyl compounds, one or more mono olefins and, optionally, further monomers as the graft monomer, on ethylene-vinyl ester copolymers as graft substrate, and to a process for their production.

It is known that styrene and acrylonitrile or mixtures thereof in any ratios can be grafted on to ethylenevinyl ester copolymers. Incompatible graft materials having a low degree of grafting are obtained in the grafting of styrene, whilst incompatible graft products with a very high degree of grafting are obtained in the grafting of acrylonitrile (cf. British Pat. Specification No. 917,499).

The degree of the grafting corresponds to the known monomer radical activity levels. In cases where mixtures of styrene and acrylonitrile are used, incompatible graft polymer products are obtained differing widely in their degree of grafting. The graft products are distinguished by the fact that a few grafting sites on the polyethylene substrate are attached to long grafting side chains. The mechanical properties and the thermoplastic processibility of such products are unsatisfactory (cf. U.S. application Pat. No. 3,177,270).

The object of this invention was to produce graft products based on ethylene-vinyl ester copolymers which, by virtue of their structure and chemical composition, can be processed without difficulty and which have high mechanical strength as well as outstanding weather resistance.

According to the invention, this object is achieved by polymerising copolymers of ethylene with vinyl esters as the graft substrate, whilst polymerising mixtures of acrylonitrile and aromatic monovinyl compounds, for example styrene, as graft monomer in the presence of mono olefins and, optionally, other vinyl monomers, for example, (meth) acrylic acid derivatives, vinyl esters and/or allyl compounds.

Accordingly, the invention provides a process for the production of graft polymers from ethylene-vinyl ester copolymers and olefinically unsaturated compounds in the presence of a radical former in homogeneous or heterogeneous phase, wherein a mixture of (meth) acrylonitrile an aromatic monovinyl compound and at least one mono olefin having from 2 to 18 carbon atoms and, optionally, other vinyl or allyl compounds is polymerized in the presence of a copolymer of ethylene with a vinyl ester of an organic monocarboxylic acid.

The ethylene-vinyl ester copolymers contain up to 75% by weight, preferably from 5 to 55% by weight, of incorporated vinyl esters. Ethylene-vinyl ester copolymers containing from 30 to 75% by weight, preferably from 40 to 55% by weight, of vinyl esters are used for special purposes.

Suitable vinyl esters include organic vinyl esters of saturated, optionally halogen (especially chlorine-substituted monocarboxylic acids having 1 to 18 carbon atoms or aromatic monocarboxylic acids having 7 to 11 carbon atoms. The following are specifically mentioned: vinylformate, vinylacetate, vinylpropionate, vinylchloropropionate, vinylbutyrate, vinylisobutyrate, vinylcaproate, vinyllaurate, vinylmyristate, vinylstearate and vinylbenzoate, preferably vinylacetate.

The ethylene-vinyl ester copolymers can be prepared by known methods of high-pressure or medium-pressure synthesis, optionally in solvents such as tert.-butanol.

The ethylene-vinyl ester copolymers produced by the high-pressure synthesis process have melt indices in the range of from 0.1 to 100, preferably from 1.0 to 10, more particularly from 4.5 to 6. The limit viscosities, measured in tetralin at 120°C, are generally in the range of from 0.6 to 1.5. The molecular weights, determined by the light-scattering method, are preferably between 50,000 and about 1 million. The non-uniformity factor U, defined in accordance with the equation $Mw/Mn - 1$ (G. V. Schulz in Z. phys. Chem. (B) 43 (1939), pages 25 – 34), is in the range from 5 to 30. These copolymers are preferably soluble in hot hydrocarbons.

The ethylene-vinyl ester copolymers produced, for example, by solution polymerisation and containing, for example, from 30 to 75% by weight, preferably from 40 to 55% by weight of vinylacetate, have melt indices which, in some cases, cannot be measured at 190°C in accordance with DIN 53 735 under a load of 2.16 kp, or which can even be greater than 100, although the preferred melt index range is below 15 and more particularly from 3 to 5. The molecular weights measured by the light-scattering method are preferably between 40,000 and 500,000. The non-uniformity factor U is in the range from 2 to 6. The copolymers are soluble in hydrocarbons and alcohols and preferably have limiting viscosities of from 0.5 to 1.5, as measured in toluene at 25°C.

If desired, the ethylene-vinyl ester copolymers can be completely or partly hydrolysed.

Methacrylonitrile and/or acrylonitrile, aromatic monovinyl compounds such as styrene, nuclear-substituted alkyl styrenes having 1 to 5 carbon atoms in the alkyl radical, for example 4-methylstyrene, α-methylstyrene, halogen styrenes such as, for example, 4-chloro-styrene, or mixtures thereof, preferably styrene and α-methylstyrene and mono olefins having 2 to 18 carbon atoms, are used as the graft monomers.

The following mono olefins are specifically mentioned: ethylene, propylene, 1-butene, 2-butene, isobutylene, 2-methyl-2-butene, 3-methyl-1-butene, diisobutylene, triisobutylene, 1-pentene, 4-methyl-1-pentene, octa-1-decene and cyclopentene.

It is preferred to use α-mono olefins having 2 to 8 carbon atoms, more particularly propylene, 1-butene or isobutylene. It is also possible to use mixtures of the olefins.

(Meth) acrylic acid derivatives may optionally be used as further vinyl compounds for grafting. (Meth) acrylic acid derivatives include (meth) acrylic acid esters having 1 to 8 carbon atoms, preferably having 1 to 4 carbon atoms, in the alcohol component, (meth) acrylic acid, (meth) acrylic acid amide or mixtures thereof.

Vinyl compounds also include vinylesters of organic saturated monocarboxylic acids having 2 to 18 carbon atoms. Vinylacetate and vinylpropionate are specifically mentioned.

It can also be of advantage to carry out the grafting reaction in the presence of allyl compounds. Preferred allyl compounds include allylacetate, allylalcohol and isobutene diacetate.

It is possible to use widely variable quantities of the monomer mixture to be grafted on, consisting of (meth) acrylonitrile, aromatic monovinyl compound, mono olefin and, optionally, vinyl and/or allyl compounds, for a given quantity of ethylene-vinylester copolymer.

It is preferred to use from 10 to 95% by weight of the monomer mixture to 5 – 905 by weight of the ethylene-vinyl ester copolymer (vinyl ester content up to 75% by weight, preferably from 5 to 55% by weight) for the graft polymerisation reaction. Products that are particularly suitable for certain purposes are obtained by using from 60 to 40% by weight of the monomer mixture to 40 – 60% by weight of the ethylene-vinyl ester copolymer (with vinylester contents of from 30 to 75% by weight, preferably from 40 to 55% by weight).

The monomer mixture used for the grafting reaction can have a percentage composition which varies widely within the components specified.

The monomer mixture used preferably consists of
I. from 15 to 80% by weight, more particularly 15 to 50% by weight, of (meth) acrylonitrile;
II. from 10 to 70% by weight, more particularly 50 to 70% by weight, of at least one aromatic monovinyl compound;
III. from 5 to 40% by weight, more particularly 5 to 30% by weight, of at least one mono olefin;
IV. 0 to 30% by weight, more particularly 0 to 15% by weight, of at least one vinyl compound; and
V. 0 to 15% by weight, more particularly 0 to 10% by weight, of at least one allyl compound,
the sum of components I to V amounting to 100%.

Monomer mixtures of components I to III are of particular interest.

The invention also relates to polymers containing graft polymers of ethylene-vinylester copolymers with polymerised units of mixtures of (meth) acrylonitrile, aromatic monovinyl compounds, of at least one mono olefin having 2 to 18 carbon atoms and, optionally, other vinyl or allyl compounds.

The polymers preferably contain graft polymers of
A. from 9 to 95% by weight, more particularly 9 to 30% by weight, of ethylene-vinylester copolymer and
B. from 91 to 5% by weight, more particularly 11 to 70% by weight of polymerized units of
I. from 20 to 85% by weight, more particularly 20 to 50% by weight, of (meth) acrylonitrile;
II. from 10 to 79.9% by weight, more particularly 50 to 77% by weight, of at least one aromatic monovinyl compound;
III. from 0.1 to 10% by weight, more particularly 0.1 to 5% by weight, of at least one mono olefin;
IV. 0 to 20% by weight, more particularly 0 to 5% by weight, of at least one vinyl compound; and
V. 0 to 10% by weight, more particularly 0 to 5% by weight, of at least one allyl compound,
the sum of A + B and the sum of components I to v amounting to 100% in each case.

Graft polymers consisting of
A. from 40 to 60% by weight of ethylene-vinylacetate copolymer containing 30 to 75% by weight, preferably 40 to 55% by weight, of incorporated vinyl acetate, and
B. from 60 to 40% by weight of polymerised units of
I. from 20 to 85% by weight, more particularly 20 to 50% by weight, of (meth) acrylonitrile;
II. from 10 to 79.9% by weight, more particularly 50 to 77% by weight, of at least one aromatic monovinyl compound;
III. from 0.1 to 10% by weight, more particularly, 0.1 to 5% by weight, of at least one mono olefin;
IV. 0 to 20% by weight, more particularly 0 to 5% by weight, of at least one vinyl compound, and
V. 0 to 10% by weight, more particularly 0 to 5% by weight, of at least one allyl compound,
the sum of A + B and the sum of components I to V amounting to 100% in each case, are particularly advantageous for special purposes.

Graft polymers containing polymerised units of components I to III are of particular interest.

The monomers are essentially grafted on to the graft substrate. However, small quantities of homo- and/or copolymers of the monomers can also be present.

The grafting reaction according to the invention can be carried out by introducing and polymerising all the monomers and α-olefins in the presence of the graft substrate. However, it is also possible to add the monomers or their mixtures and the α-olefins to the graft mixture either continuously or in batches. Surprisingly, we have now found that graft polymer products having extremely good mechanical strength values can be obtained, especially where the monomers or their mixtures are added in batches. The radical formers can be added at the beginning of the reaction either all at once or continuously or in batches before, during or after the addition of the monomers. It is also often advantageous to introduce different radical formers during the reaction.

For grafting, the graft substrate should best be present in finely divided or dissolved form in order to obtain substantially uniform distribution of the degree of grafting. However, it is also possible, in principle, to start with coarsely granulated polyethylene of the kind which accumulates, for example, in the high-pressure polymerisation of ethylene.

If the grafting reaction is to be carried out in solution (homogeneous phase), it is best to use as solvents saturated aliphatic or aromatic hydrocarbons such as ethane, propane, the isomeric butanes, pentanes hexanes or mixtures, petroleum ether, light gasoline and other gasoline fractions, benzene, toluene, the isomeric xylenes and other substituted benzene derivatives for example chlorobenzene, halogenated aliphatic hydrocarbons such as methyl chloride, methylene chloride, chloroform, carbon tetrachloride, trichlorofluoromethane and other Frigens, trichlorethylene, tetrachlorethylene and difluoroethylene, low-boiling alcohols such as methanol, ethanol, propanol, isopropanol, isomeric butanols, preferably tert.-butanol.

It is also possible, however, to use the mono olefin in such an excess that it acts as solvent itself.

The graft substrates can be dissolved at temperatures of from about 20° to 120°C. Higher temperatures can, of course, also be applied where solvents having relatively high boiling points are used or where dissolution is carried out under elevated pressure.

The grafting reaction can also be carried out in the heterogeneous phase. In this case, the graft substrate can be used in the form of granulates, spherical particles, in cylindrical form, flake form, spiral form or in the form of other shaped elements.

Where the grafting reaction is carried out in heterogeneous phase, the graft substrates are preferably in powder or granulate form having grain sizes of from about 1 μ to about cm.

The graft substrates can be contacted with the monomer mixture by spray-coating, spread-coating, dip-coating or by dispersing the substrate in the monomer mixture, the monomers swelling completely or partly into the substrate. The substrate particles can undergo an increase in volume with their original form substantially intact. For the swelling operation and also for the subsequent grafting operation, the monomer mixture can be present either undiluted or in solution in solvents or dispersed in an organic diluent and/or water. The diluents used here correspond to the solvents referred to above with regard to the grafting reaction. Whether complete dissolution occurs or whether the substrate particles merely swell depends on the type and quantity of solvent used, on the temperature, pressure and type of graft substrate. Naturally, swelling is accompanied by partial dissolution of the substrate particles. However, the dissolved fraction of the individual substrate particle remains substantially in the undissolved fraction of the substrate particle so that, despite an increase in volume, the original form remains intact.

Swelling of the graft substrates can be carried out at temperatures of up to about 85°C, optionally in the presence of the polymerisation catalysts.

Graft copolymerisation can be carried out in homogeneous or heterogeneous phase at temperatures of from about −20°C to +250°C, preferaby at temperatures of from +30°C to +150°C, and under pressures of up to 500 atms., preferably under normal pressure (1 atm.) to 21 atms.

It is also quite possible initially to prepare a homogeneous phase from the graft substrate, aromatic vinyl compound or monomer mixture, optionally catalyst and optionally solvent, to disperse the solution in water and then to carry out polymerisation, optionally following addition of the catalyst.

The graft substrate particles swollen by the monomer mixture, optionally in the presence of a radical former, can also be polymerised in the presence of inert or substantially inert gases such as nitrogen or carbon dioxide.

Where graft polymerisation is carried out in heterogeneous phase, the swollen graft substrate is preferably present in solution in an organic solvent or in water or in a heterogeneous or homogeneous mixture of solvent and water.

The polymerisation catalysts can be added to the polymerisation mixture before, during or after the dissolving or swelling operation.

The polymerisation catalysts are best used in a quantity of from 0.01 to 1.5% by weight, based on the total weight of the graft substrate and graft monomers. These quantities can, of course, be considerably exceeded.

Per compounds or radical-yielding azo compounds can be used as the polymerisation catalysts. The following are mentioned as examples: benzoyl peroxide, tert.-butyl perpivalate, lauroyl peroxide, tert.-butyl peroctoate, tert.-butyl perbenzoate, di-tert.-butyl peroxide, tert.-butyl perisononate, diisopropyl percarbonate, dicyclohexyl percarbonate, acetylcyclohexyl hexane sulphonyl peroxide, dicumyl peroxide, azo-bis-isobutyronitrile, etc. It is preferred to use benzoyl peroxide, tert.-butyl perpivalate, tert.-butyl peroctoate, dicyclohexyl percarbonate, dicumyl peroxide and azo-bis-isobutyronitrile.

Conventional redox systems which can be made up of peroxygen compounds (such as potassium persulphate) and inorganic and organic reducing agents, as described, for example in Methoden der organischen Chemie, Houben-Weyl, 4th Edition, (1961), Vol. 1411, pages 263–297, are also suitable for carrying out the grafting reaction according to the invention.

Initiator radicals can also be produced by UV-radiation (which can also be carried out in the presence of peroxygen compounds with or without a sensitiser) X-rays, γ-rays or accelerated electrons. Additional regulators of the kind normally used in polymerisation reactions, can, of course, also be used.

The usual auxiliaries such as molecular weight regulators can be added to the polymerisation mixtures and, in the case of dispersion polymerisation, dispersants, for example ethylene-vinyl acetate copolymers with 45% by weight of vinyl acetate and a high melt index or acrylic ester polymers can be added.

The process according to the invention can be carried out continuously or in batches. The grafting reaction can be carried out either in the presence or absence of solvents in polymerisation screws, whilst evaporation of the solvent or residual monomers from the graft polymerisation mixture can be carried out in evaporation screws, thin-layer evaporators or spray-dryers.

In the process according to the invention, the monomers styrene and/or acrylonitrile are grafted on in quantities of about 50 to 100% by weight and preferably in quantities of from 80 to 100% by weight. It is possible by extraction or fractional precipitation to detect little or no ungrafted styrene-acrylonitrile copolymer, i.e. styrene-acrylonitrile copolymer which has not been chemically anchored to the substrate used. In contrast, approximately 50% by weight or more of the styrene-acrylonitrile used can very frequently be isolated ungrafted as copolymer from a mixture prepared without the use of regulating α-olefins, but in otherwise the same way.

Tables 1 and 2 show the results of the fractional precipitation of a graft polymer product prepared in accordance with the invention (Example 3) and a reaction product prepared by a conventional method (comparison Example 2). One and the same ethylene vinyl acetate copolymer was used as graft substrate in both tests.

Table 1

| Test | Ungrafted SAN-copolymer | [ν] toluene | Melt index at 190°C |
|---|---|---|---|
| Example 3 | — | 0.33 | 0.13 |
| Comparison Example 2 | 52% by weight | 2.31 | cannot be measured |
| Ethylene-vinylacetate copolymer | — | 1.37 | 3.6 |

The reaction product obtained in accordance with Comparison Example 2 contains 52% by weight of the styreneacrylonitrile mixture used in the form of ungrafted copolymer and has a relatively high limiting viscosity by comparison with the starting substrate and the graft polymer product prepared in accordance with Example 3.

Also, the superior chemical uniformity of the graft polymer product prepared in accordance with the invention (Example 3) by comparision with the material prepared in accordance with comparison Example 2 is reflected in the following fractionation results:

Table 2

| Example 3 | Fraction | % by wt. | [η] | acrylonitrile content % by wt. |
|---|---|---|---|---|
| | 1 | 5.6 | insoluble | 20.8 |
| | 2 | 8.2 | 0.53 | 20.1 |
| | 3 | 9.25 | 0.48 | 20.5 |
| | 4 | 25.9 | 0.24 | 22.4 |
| | 5 | 22.6 | 0.34 | 21.6 |
| | 6 | 15.25 | 0.27 | 19.7 |
| | 7 | 10.25 | 0.24 | 19.7 |
| | rest | 0.95 | | |

| Comparison Example 2 | Fraction | % by wt. | [η] | acrylonitrile content % by wt. |
|---|---|---|---|---|
| | 1 | 10.5 | insoluble | 16.6 |
| | 2 | 50.9 | 3.08 | 19.0 |
| | 3 | 10.0 | 1.26 | 25.8 |
| | 4 | 14.5 | 0.76 | 25.0 |
| | 5 | 8.8 | 0.25 | 24.2 |
| | 6 | 2.25 | 0.15 | 16.0 |
| | rest | 0.3 | | |

Accordingly, reaction products having the following distinguishing features are obtained by the process according to the invention:

1. No ungrafted styrene-acrylonitrile copolymer.
2. More than 80% by weight of the graft product always has a substantially uniform chemical structure.
3. In addition to other findings, the solution behaviour, as reflected in the [η]-values measured, shows that
the graft chains are relatively short and uniformly distributed throughout the graft substrate used.

In contrast, reaction products prepared without the use of regulating α-olefins are not only chemically highly irregular, they are also highly irregular in their structure on account of their vastly different solution viscosities. This also accounts for the poor thermoplastic processing properties of graft polymer products such as these and their undesirable inhomogeneity.

Also, a not inconsiderable advantage of the process according to the invention is that, where α-olefins are used, thermal process regulation does not involve any difficulties because, in contrast to the unregulated process, no sudden heat effects occur during the reaction.

It is particularly expedient to prepare the impactresistant polymers of the invention by means of a modified bulk bead polymerisation. In such a process, a solution of e.g. styrene, acrylonitrile, an ethylene/vinyl acetate copolymeri having 45% by weight of vinyl acetate and a radical-forming initiator is stirred with water so that a water-in-oil emulsion forms. Suitable stirrers are for example modified anchor stirrers. For the stabilisation of such emulsions, dispersants are particularly suitable such as graft products of styrene or other vinyl monomers on polyethers of ethylene oxide, or styrene copolymers with α,β-unsaturated carboxylic acids, or a 1 : 1 copolymer or methacrylic acid / methacrylic acid methylester. Naturally other water-in-oil emulsifiers can be employed.

The ratio of water phase : organic phase should not exceed 3 : 1 in the water-in-oil emulsion stage and should preferably be in the range of 0.2 : 1 to 1 : 1. In the case of a highly viscous, organic phase or in larger batches it is expedient to mix the components whilst stirring. The water phase should always be added to the organic phase, otherwise a true water-in-oil emulsion will not in general be produced. The α-olefins required to carry out the process of the invention can be added at the dissolving stage or at a later point, but at the latest prior to addition of the second water phase. If the water-in-oil emulsion is used to yield a high polymerisation conversion rate without further technical measures being undertaken, the system can become highly viscous and no longer stirrable or phase reversal can take place and the polymerisation finished as an oil-in-water dispersion. Only the second of the two is desirable, that is phase reversal. The water is substantially present as a continuous phase. A minor part of the water (approximately 10 to 100% by weight of the organic phase), however, can remain in the beads of the organic phase.

A direct phase reversal is sometimes carried out by the addition of water. It is however expedient when introducing water into the water-in-oil emulsion to add an auxiliary dispersant, which has proved of value in emulsion or dispersion polymerisations, e.g., polyvinyl alcohol, partly saponified polyvinyl acetate, alkyl cellulose, such as e.g. methylcellulose, alkylsulphonates or alkyl sulphates. The weight ratio of water to organic phase of the second stage is not above 10 : 1, preferably between 3 : 1 and 1 : 1.

Whereas polymerisation is begun in the first stage of the water-in-oil emulsion at temperatures of 30° to 120°C, preferably at 60 to 85°C, in the presence of α-olefins, preferably up to a conversion of 10 to 60%, polymerisation is completed in the second stage at temperatures between 40° to 180°C, preferably at 80 ° to 150°C, as an oil-in-water dispersion.

The addition of water and of any auxiliary suspension agents is preferably begun when the water-in-oil emulsion is prepared and the reaction mixture has reached the polymerisation temperature of the second stage (oil-in-water dispersion).

A particular advantage of this proces is the simple method of working-up and the unproblematic drying of the resulting bead polymer which has a porous structure. Furthermore, it is extremely easy with the aid of this bulk head process to obtain graft products having a cross-linked rubber phase by combination of different peroxide or radical-forming substances. The initial cross-linking is particularly advantageous if thermoplastics are required with high mechanical strength. If work is carried out in the described manner, then graft materials are obtained which after thermoplastic processing yield mouldings with a particularly pleasant surface sheen.

The products according to the invention can be obtained in solution, it dispersion or in the form of plastics compositions depending on whether grafting is carried out in homogeneous or heterogeneous phase. For example, it is possible directly to obtain finely divided thermoplast powders having an average particle size of less than 1,000 μ which are eminently suitable for coating purposes, for a variety of different power coating processes, for example fluidisation dip coating, flame spraying, electrostatic powder spraying, or for rotational moulding.

The products obtained in accordance with the invention are eminently suitable for use as coating materials and thermoplastically processible plastics. Even the graft products with high styrene/acrylonitrile contents can be processed without any difficulty to conventional machines of thermoplast technology. By virtue of their outstanding compatibility, some of the graft polymers are extremely transparent, The mechanical strength values are excellent in contrast to the mixtures of the thermoplasts which are known to be totally incompatible and without strength.

The parts and percentages quoted in the following Examples refer to weight unless otherwise stated.

The melt indices were measured in accordance with DIN 53 735 at 190°C under a pressure of 2.16 kp.

In order to determine the grafted component, the ungrafted graft-substrate fractions were separated off from the grafted substrate and the ungrafted polymerised monomer units by single and/or double fractional precipitation. To this end, the graft polymer product was dissolved (for example in dimethyl formamide, benzene or toluene-dimethyl formamide mixtures) and then sucessively precipitated under heat, for example with n-butanol or methanol.

The graft substrate content of the graft polymer is the difference between 100% and the sum of the percentage contents of the monomers grafted on.

The mechanical values quoted in the Examples are based on the following Standards:
  Impact strength according to DIN 53 453 measured at room temperature, unless otherwise stated.
  Notched impact strength according to DIN 53 453 measured at room temperature, unless otherwise stated.
  Dimensional stability under heat according to Vicat, DIN 53 460, in °C (referred to in the Examples as the Vicat temperature).
  Ball indentation hardness according to DIN 53 456
  Bending stress acording to DIN 53 452
  Tensile strength $\sigma_B$ according to DIN 53 455
  Elongation $\epsilon$ according to DIN 53 455
  E-modulus according to DIN 53 457
  Stretching strains $\sigma_S$ according to DIN 53 454.

EXAMPLE 1

4,000 ml of water and 200 ml of a 10% dispersant solution (1 : 1 copolymer of methacrylic acid/methacrylic acid methyl ester, adjusted to pH 7) were introduced into a nitrogen-filled 12-litre stirrer-type autoclave. This was followed by the addition of 3000 g of a granulated high-pressure ethylene-vinyl acetate copolymer with a vinylacetate content of 8.5% (melt index 5.1), 67 g of acrylonitrile, 183 g of styrene and 3.75 g of benzoyl peroxide. The autoclave was repeatedly evacuated and rinsed with 1-butene, after which 100 g of 1-butene were introduced. The contents of the autoclave were then stirred for 3 hours at 50°C/2.5 atms. and then for 6 hours at 85°C/3.0 atms. After cooling and venting, the reaction product was filtered off under suction, washed and dried. A graft product having an acrylonitrile content of 1.9%, a styrene content of 4.7% and a 1-butene content of 0.2% (melt index 1.29), was obtained in a yield of 3,220 g.

It was calculated from the above data that the graft product consisted of 93.2% of graft substrate and 6.8% of grafted-on monomer units. The monomer units grafted on in turn consisted of approximately 28% of polymerized acrylonitrile, 69% of polymerised styrene and approximately 2.9% of polymerized 1-butene.

EXAMPLE 2

4,000 ml of water, 8 g of sodium alkyl sulphonate having approximately 13 to 15 carbon atoms in the alkyl radical, 100 ml of a 5% dispersant solution (ethoxylated adipic acid amide), 3,000 g of a granulated high-pressure ethylene-vinyl acetate copolymer with a vinyl acetate content of 8.5% (melt index 5.1), 800 g of acrylonitrile, 200 g of styrene and 7.5 g of benzoyl peroxide, were introduced into a nitrogen-filled 12-litre stirrer-type autoclave. The autoclave was repeatedly evacuated and rinsed with propylene. 200 g of propylene were then introduced. The contents of the autoclave were then stirred for 5 hours at 50°C/5.5 atms. and then for 6 hours at 85°C/ 7.5 atms. After cooling and venting, the reaction product was collected, washed and dried. A graft product having an acrylonitrile content of 18.0%, a styrene content of 3.9% and a propylene content of 0.6% (melt index 1.30), was obtained in a yield of 3,870 g.

Table 3

| Example | $\delta_S$ kp/cm² | $\delta_B$ kp/cm² | % |
|---|---|---|---|
| 1 | 108 | 132 | 709 |
| 2 | 144 | 153 | 632 |

EXAMPLE 3

300 g of an ethylene-vinylacetate copolymer with a vinylacetate content of 45% (melt index 3.6), and 1,460 g of styrene were introduced into a 12-litre stirrer-type autoclave. The autoclave was evacuated and rinsed repeatedly with propylene. 100 g of propylene and 300 g of 1-butene were then introduced. The contents of the autoclave were then stirred for 3 hours at 60°C/ 4.5 atms. pressure, after which 5,200 ml of water, 800 ml of dispersant solution (as in Example 1), 540 g of acrylonitrile and 7.5 g of benzoyl peroxide were added. This was followed by stirring for 1 hour at 60°C/9 atms. and then for 6 hours at 85°C/11.5 - 18 atms. pressure. After cooling and venting, the residual monomers were azeotropically distilled off from the mixture with steam. The bead polymer was isolated by filtration and washed with water. A graft product having an acyrlonitrile content of 20.4 %, a styrene content of 64.8% and an α-oelfin content of 0.9% (melt index 0.13), was obtained in a yield of 2180 g.

EXAMPLE 4

In a 12-litre stirrer-type autoclave, 300 g of an ethylene-vinylacetate copolymer having a vinylacetate content of 45% (melt index 3.6) were dissolved in 3000 ml of tert.-butanol. The autoclave was evacuated and rinsed with 1-butene. Its contents were then stirred for 2 hours at 85°C/4.5 atms. pressure, after which 270 g of acrylonitrile, 600 g of styrene, 130 g of α-methylstyrene and 4 g of tert.-butyl peroctoate in 500 ml of tert.-butanol were added. The mixture was then stirred for 4 hours at 100°C/6 atms. pressure. 270 g of acrylonitrile and 730 g of styrene, 1 g of tert.-butyl peroctoate and 3 g of dicumyl peroxide in 500 ml of butanol were added. The contents of the autoclave were then stirred for 2 hours at 100°C/7 atms., for 3 hours at 120°C/9 atms. and then for 6 hours at 145°C/13 atms. Solvent and residual monomers were distilled off azeotropically with hot steam and the anhydrous reaction product was dried. A graft product having an acrylontrile content of 22.5%, a styrene content of 59%, an α-methylstyrene content of 4.5% and a 1-butene content of 0.7% (melt index 0.22), was obtained in a yield of 2230 g.

EXAMPLE 5

A solution of 200 g of an ethylene-vinylacetate copolymer with a vinylacetate content of 45% (melt index 3.6) in 1,500 g of styrene was introduced with vigorous stirring into a solution of 48 g of sodium alkyl sulphonate having about 13 to 15 carbon atoms in the alkyl radical in 4,800 ml of water in a 12-litre capacity stirrer-type autoclave. 500 g of acrylonitrile and 10 g of tert.-butyl peroctoate were then added. The autoclave was evacuated and rinsed with propylene, after which 400 g of propylene were introduced. The contents of the autoclave were stirred for 1 hour at 60°C, followed by the addition of a solution of 3.2 g of Decroline in 200 ml of water. After stirring for 6 hours at 60°C/17 atms., the emulsion obtained was worked up by precipitation. The reaction product was carefully washed and dried. A graft product having an acrylonitrile content of 25.4%, a styrene content of 63.2 % and a propylene content of 1.8% (melt idex 0.1), was obtained in a yield of 2,085 g.

EXAMPLE 6

1,400 g of an ethylene-vinylacetate copolymer having a vinylacetate content of 45% (melt index 3.6) were dissolved in 4,200 g of styrene at 40°C in a 40-litre capacity stirrer-type autoclave. 1,400 g of acrylonitrile, 350 g of allyl acetate and 13g of benzoyl peroxide were then introduced, followed by the addition of 14,000 ml of water and of 1,800 ml of a dispersant solution (cf. Example 1). The autoclave was evacuated and rinsed with 1-butene, after which 700 g of 1-butene and 300 g of porpylene were introduced. The contents of the autoclave were then stirred for 1 hour at 40°C and then for 4 hours at 85°C/9.5 – 13.5 atms. pressure. 13 g of benzoyl peroxide dispersed in 1,000 ml of water and 200 ml of the dispersant solution were then added. This was followed by stirring for 6 hours at 85°C under a pressure of 14.5 to 13.2 atmospheres. The dispersion was freed from residual monomers by distillation and the reaction product was isolated by filtration, washed and dried. A graft product having an acrylonitrile content of 18%, a styrene content of 57.2%, an allyl acetate content of 2.0% and an α-olefin content of 2.7% (melt index 0.79), was obtained in a yield of 6750 g.

EXAMPLE 7

350 g of granulated polyethylene with a vinylacetate content of 8,5% (melt index 5.1) and 4000 ml of benzene were introduced into a 12-litre stirrer-type autoclave. The autoclave was evacuated and rinsed with 1-butene, after which 200 g of 1-butene were introduced. The contents of the autoclave were then stirred for 2 hours at 85°C/3 atms. pressure, after which 1,460 g of styrene and 540 g of acrylonitrile were introduced. This was followed by stirring for 1 hour at 85°C/3.5 atms. pressure. A solution of 3.9 g of benzoyl peroxide in 50 ml of benzene and 50 ml of tert.-butanol was then introduced. The contents of the autoclave were stirred for 8 hours at 85°C/4 atms. pressure. Solvent and residual monomer were removed from the mixture by distillation. A graft product having an acrylonitrile content of 19.5%, a styrene content of 59.0% and a 1-butene content of 0.7% (melt index 0.28), was obtained in a yield of 1,680 g.

EXAMPLE 8

10 litres of tert.-butanol, 400 g of an ethylene-vinylacetate copolymer having a vinylacetate content of 45% (melt index 3.6), 2000 g of acrylonitrile, 2000 g of styrene and 15 g of α,α'-azodiisobutyronitrile, were introduced into a 30-litre autoclave. The autoclave was then evacuated and rinsed with propylene until free from air. 400 g of propylene were then introduced. The contents of the autoclave were then stirred for 3 hours at 40'C/1.5 atms. and then for 8 hours at 80°C/3 atms. pressure. Solvent and residual monomers were stripped off with hot steam and the reaction product was filtered off and dried. A graft product having an acrylonitrile content of 41.0%, a styrene content of 47% and a propylene content of 2%, was obtained in yield of 4160 g. The melt index value could not be determined at 190°C. The graft product could be moulded into high-impact mouldings.

EXAMPLE 9

350 g of an ethylene-vinylacetate copolymer having a vinylacetate content of 45% (melt index 3.6), 4,000 ml of tert.-butanol, 1,400 g of acrylonitrile, 200 g of styrene and 10 g of α,α'-azo-diisobutyronitrile, were introduced into a 12-litre stirrer-type autoclave. The autoclave was evacuated, rinsed with isobutylene and 200 g of isobutylene were introduced. The contents of the autoclave were then stirred for 2 hours at 40°C/3 atms. pressure and then for 8 hours at 80°C under a pressure which fell from 5 to 4 atms. The solvent and the residual monomers were removed by distillation with steam and, after drying, 1,940 g of a graft product were obtained which was found to be soluble in dimethylformamide $$[\eta]_{DMF}^{120°} : 0.74$$

and which could be processed in mouldings by any of the methods normally used for processing thermoplastic plastics. The graft product contained 69.5% of acrylonitrile, 10% of styrene and 2.5% of isobutylene in polymerised units. The material obtained could be processed into hard, tough gas-tight coatings at 180°C either by spraying from solution or by applying the organic dispersion.

EXAMPLE 10

1litre of tert.-butanol, 50 g of an ethylene-vinyl acetate copolymer having a vinylacetate content of 45% (melt index 3.6), 100 g of acrylonitrile, 5 g of acrylic acid, 300 g of styrene and 3.0 g of α,α'-azo-diisobutyronitrile, were introduced into a 3-litre stirrer-type autoclave. The autoclave was evacuated, rinsed with propylene and 50 g of propylene were introduced. The contents of the autoclave were stirred for 3 hours at 40°C/5 atms. and then for 8 hours at 75°C/6 atms. pressure. the solvent and residual monomers were distilled off azeotropically with hot steam and the reaction product was dried. A graft product soluble in chlorobenzene with an acrylonitrile content of 20.8%, a styrene content of 64%, an acrylic acid content of 0.9% and a propylene content of 1.8% (melt index 4.50) was obtained in a yield of 405 g. This material could be processed at 160°C into hard, tough coatings which adhere very firmly to metals and which show outstanding light stability.

EXAMPLE 11

15,000 ml of tert.-butanol, 1,400 g of an ethylenevinylacetate copolymer having a vinylacetate content of 45% (melt index 3.6), 4,200 g of styrene, 1,400 g of acrylonitrile, 700 g of allyl acetate and 13 g of benzoyl peroxide, were introduced into a 40-litre stirrer-type autoclave. The autoclave was evacuated, rinsed with propylene and 400 g of propylene were introduced. The reaction mixture was stirred for 1 hours at 50°C/3 atms. pressure and then for 4 hours at 85°C/4.2 atms. pressure. Another 13 g of benzoyl peroxide in 200 ml of tert.-butanol were then introduced, followed by stirring for 6 hours at 85°C/5 atms. pressure. The reaction product was washed in a kneader with ethanol, filtered off and dried. A graft product having an acrylonitrile content of 19%, a styrene content of 55.8%, an allyl acetate content of % and a propylene content of 0.5% (melt index 0.35), was obtained in a yield of 6,480 g.

EXAMPLE 12

17,000 ml of tert.-butanol, 5000 g of an ethylenevinylacetate copolymer having a vinylacetate content of 45% (melt index 3.6) and 5,000 g of styrene were introduced into a 40-litre capacity stirrer-type autoclave. The autoclave was evacuated and rinsed with propylene. After the introduction of 1,000 g of propylene, the contents of the autoclave were stirred for 3 hours at 60°C/5 atms. pressure. 2,000 g of acrylonitrile and 18.5 g of benzoyl peroxide dissolved in 150 ml of tert.-butanol and 75 ml benzene were then added. This was followed by stirring for 1 hour at 60°C/6 atms. pressure and for 8 hours at 85°C/6.5 atms. pressure. The reaction product was washed with water on a grooved roller and then dried. A graft product having an acrylonitrile content of 15.6%, a styrene content of 38.6% and a propylene content of 1.2% was obtained in a yield of 11.2 kg (melt index 0.85). This material was found to be particularly suitable for the preparation of mixtures.

EXAMPLE 13

3000 ml of tert.-butanol, 300 g of an ethylene-vinyl acetate copolymer having a vinylacetate content of 45% were introduced into a 12-litre stirrer-type autoclave. The autoclave was evacuated, rinsed with 1-butene and then 400 g of 1-butene were introduced. The contents of the autoclave were then stirred for 3 hours at 60°C/3 atms. pressure, followed by the addition of 270 g of acrylonitrile, 730 g of styrene, 500 ml of tert.-butanol and 3.75 g of benzoyl peroxide. The resulting reaction mixture was heated to 85°C and then stirred for 3 hours at 85°C/5.5 atms. pressure. This was followed by the addition of 270 g of acrylonitrile, 730 g of styrene, 500 ml of tert.-butanol and 3.75 g of benzoyl peroxide. The contents of the autoclave were then stirred for 8 hours at 85°C/7 atms. pressure. The reaction product was washed with ethanol on a kneader, filtered off and dried. A graft product having an acrylonitrile content of 21%, a styrene content of 62.5% and a 1-butene content of 3% was obtained in a yield of 2260 g (melt index 0.61).

Table 4

| Example | Impact Strength cm kp/cm² | Notched impact strength cm kp/cm² | Vicat temperature °C | Ball indentation hardness 30''kp/cm² |
|---|---|---|---|---|
| 3 | 64.9 | 5.66 | 102 | 1460 |
| 4 | 80 to unbroken | 13.5 | 106 | 1143 |
| 5 | 45.6 | 7.7 | 98 | 1220 |
| 6 | 53.5 | 5.8 | 90 | 922 |
| 7 | 43.8 | 4.7 | 103 | 1069 |
| 8 | 62.9 | 5.6 | 92 | 998 |
| 11 | 77.3 to unbroken | 8.79 | 90 | 897 |
| 12*) | unbroken | 21.9 | 46 | 342 |
| 13 | 80 to unbroken | 14.3 | 94 | 986 |
| 14 | 80 to unbroken | 14.0 | 100 | 1012 |
| Comparison Examples | | | | |
| 1 | 19.4 | 2.06 | 101 | 1128 |
| 2 | 15.3 | 1.28 | 94 | 1245 |

*)Material is used for mixtures.

EXAMPLE 14

300 g of an ethylene-vinyl acetate copolymer having a vinylacetate content of 45% by weight (melt index 3.6) and 3,000 ml of tert.-butanol were introduced into a 12-litre stirrer-type autoclave. The autoclave was evacuated, rinsed with 1-butene and then 200 g of 1-butene were introduced. The contents of the autoclave were then stirred for 2 hours at 100°C/5.5 atms. pressure, after which 270 g of methacrylonitrile, 730 g of styrene, 4 g of tert.-butanol peroctoate in 500 ml of tert.-butanol were added and the mixture was stirred for 4 hours at 100°C/6.2 atms. pressure. 270 g of methacrylonitrile, 730 g of styrene, 1 g of tert.-butyl peroctoate, 3 g of dicumyl peroxide in 500 ml of tert.-butanol were then added, followed by stirring for 2 hours at 100°C/7.0 atms., for 3 hours at 120°C/8.0 atms. and for 6 hours at 145°C/10.5 atms. The solvent and residual monomers were azeotropically distilled off with hot steam. After drying, a copolymer having a methacrylonitrile content of 22.1%, a styrene content of 63.3% and a 1-butene content of 1.1% (melt index 0.38) was obtained in a yield of 2285 g.

EXAMPLE 15

13 litres of tert.-butanol, 4,000 g of an ethylenevinyl acetate copolymer having a vinylacetate content of 33% by weight (melt index 15) and 4,000 g of styrene were introduced into a 40-litre capacity stirrer-type autoclave. The autoclave was evacuated and rinsed with propylene until free from air. 750 g of propylene were then introduced. The mixture was then stirred for 3 hours at 60°C under a pressure of 3.0 atms. 2,000 g of acrylonitrile and 15 g of azo-bis-isobutyronitrile in 200 ml of tert.-butanol were then introduced, followed by stirring for 1 hour at 60°C/3.2 atms. and then for 8 hours at 80°C/4.0 atms. pressure. The reaction product was isolated by washing the dispersion with water on a grooved roller and drying the resulting rough sheet. A material having an acrylonitrile content of 15.6%, a styrene content of 40.4% and a propylene content of 0.7% (melt index 7.5) was obtained in a yield of 9.24 kg. This graft product could be used for mixtures and as a plasticiser.

EXAMPLE 16

13,000 ml of tert.-butanol, 5,000 g of an ethylenevinylacetate copolymer having a vinylacetate content of 70% ($[\eta]^{25°C}$ toluene = 0.7) and 4,000 g of styrene were introduced into a 40-litre capacity stirrer-type autoclave. The autoclave was evacuated, rinsed with propylene and then 500 g of propylene were introduced. The mixture was then stirred for 3 hours at 85°C/2.5 atms. pressure. 1,500 g of acrylonitrile were then introduced with 20 g of benzoyl peroxide. This was followed by stirring for 8 hours at 85°C/3 atms. pressure. The reaction product was worked up as described in Example 15, giving 9,580 g of a graft copolymer having an acrylonitrile content of 11.4%, a styrene content of 35.4% and a propylene content of 1% (melt index 0.96). The resulting graft material was eminently suitable for mixtures.

EXAMPLE 17

2,400 g of a solution of 1 part of an ethylene/vinyl acetate copolymer having 54% by weight of vinyl acetate (melt index 3.6) in 4 parts of styrene are introduced in a nitrogen atomsphere into a 12 litre stirrer-type autoclave with an anchor stirrer. Whilst stirring there are then added 6.45 g of tert.-butylperpivalate and 4.5 g of di-tert.-butylperoxide, 606 g of acrylonitrile, 180 ml of a 10% solution of a methacrylic acid/methacrylic acid methylester copolymer and 2,500 ml of water, which contain 0.8 g of dissolved sodium pyrosulphite. The autoclave is then closed, evacuated and rinsed with nitrogen. Thereafter 200 g of propylene are introduced under pressure. The resulting water-in-oil emulsion is heated to 80°C whilst stirring. When an inside temperature of 80°C is reached, a solution of 18 g of sodium dihydrogen phosphate and 1.8 g of an alkyl sulphonate with 12 to 14 C atoms in the alkyl chain in 3,000 ml of water is continuously pumped in a nitrogen atmosphere into the mixture within 4 hours. Stirring is carried out for another hour at 80°C. The non-reacted propylene is then removed and the mixture stirred in a nitrogen atmosphere for 4 hours at 140° to 145°C. After removal of the residual monomers from the mixture by azeotrpoic steam distillation the bead polymer is isolated by filtration, washed and dried to a weight constant of approximately 50°C. There are obtained 2,870 g of a graft polymer with an acrylonitrile content of 19.7% by weight, a styrene content of 62.4% by weight and a propylene content of 1.2% by weight (melt index 0.11).

| Impact Strength | 82 cm kg/cm² |
| Notched Impact Strength | 12 cm kg/cm² |
| E-Modulus | 25500 |
| Vicat Temperature | 101°C. |

EXAMPLE 18

150 g of an ethylene/vinyl acetate copolymer having a vinyl acetate content of 45% (melt index 3.6) are dissolved at 60°C in 112 g of styrene and 38 g of acrylonitrile in a nitrogen atmosphere in a 3 litre stirrer vessel. The solution is heated up to 80°C and stirred with 3 g of a graft product of styrene on polyethylene oxide, 57 g of a 10% aqueous solution of a 1 : 1 copolymer of methacrylic acid/methacrylic acid methylester, 700 g of water and 0.3 g of dibenzoyl peroxide. The resulting water-in-oil emulsion in stirred for 1 hour at 80°C. During this time 130 g of isobutylene are introduced. Thereafter a solution of 2 g of $C_{12}$–$C_{14}$ alkyl sulphonate sodium in 700 g of water are introduced within 30 minutes and the mixture stirred for 5 hours at 80°C.

After working up the bead polymer as in Example 17 there are obtained 215 g of a graft copolymer having 5.6% by weight of acrylonitrile, 64.4% by weight of ethylene/vinyl acetate copolymer, 29.1% by weight of styrene, 0.8% by weight of isobutylene and an intrinsic viscosity $[\eta]=0.82$ determined in dimethylformamide at 25°C.

Comparison Example 1 (compared with Example 11 without propylene)

200 g of an ethylene-vinylacetate copolymer (cf. Example 11) were dissolved under nitrogen in 600 g of styrene in a 6-litre stirrer-type vessel. This was followed by the addition of 200 g of acrylonitrile, 2,000 ml of water, 200 ml of a 10% dispersant solution (cf. Example 1), 25 g of allyl acetate and 5 g of benzoyl peroxide. The resulting mixture was then stirred for 1 hour at 60°C and then for 10 hours at 85°C. A stable dispersion was obtained. A graft product was isolated by coagulating the dispersion, followed by careful washing and drying. A graft product having an acrylonitrile content of 18.0%, an allyl acetate content of 1% and a styrene content of 59% (melt index 0.14) was obtained in a yield of 907 g.

Comparison Example 2

200 g of an ethylene-vinylacetate copolymer having a vinylacetate content of 45% (melt index 3.6) were dissolved under nitrogen in 1,000 g of styrene in a 6-litre stirrer-type vessel. This was followed by the addition of 370 g of acrylonitrile, 2,000 ml of water, 200 ml of a 10% dispersant solution (cf. Example 1) and 5 g of tert.-butyl perpivalate. The mixture was then stirred at 400 rpm. for 1 hour at room temperature, resulting in the formation of a stable dispersion which was then stirred for 10 hours at 60°C. The reaction product was isolated by precipitation, washed and dried. A material having an acrylonitrile content of 20.5% and a styrene content of 64.5% (melt index cannot be measured at 190°C) was obtained in a yield of 1335 g.

We claim:

1. A process for the production of a graft polymer from ethylene-vinyl ester copolymers and olefinically unsaturated compounds in the presence of a radical former in homogeneous or heterogeneous phase, wherein a mixture of acrylonitrile, methacrylonitrile or a mixture thereof, at least one aromatic monovinyl compound, at least one monoolefin containing 2 to 18 carbon atoms, 0–30% by weight of another vinyl compound selected from the group consisting of acrylic acid esters and methacrylic acid esters with 1 to 8 carbon atoms in the alcohol component, acrylamide, methacrylamide, acrylic acid, methacrylic acid, vinyl esters of organic saturated monocarboxylic acids containing 2 to 18 carbon atoms and mixtures thereof and 0–15% by weight of an allyl compound selected from the group consisting of allyl alcohol, allyl acetate, isobutene diacetate and mixtures thereof is polymerized in the presence of a copolymer of ethylene with a vinyl ester of an organic monocarboxylic acid.

2. A process as claimed in claim 1, wherein propylene, 1-butene, isobutylene or mixtures thereof are used as the mono olefins.

3. A process as claimed in claim 1, wherein the organic vinyl esters are derived from organic carboxylic acids containing 1 to 18 carbon atoms.

4. A process as claimed in claim 1, wherein styrene, nuclear-substituted alkyl styrenes with 1 to 5 carbon atoms in the alkyl radical, α-methylstyrene, halogen styrenes or mixtures thereof are used as the aromatic monovinyl compounds.

5. A process as claimed in claim 1, wherein from 10 to 95% by weight of monomer mixture and from 90 to 5% by weight of ethylene-vinyl ester copolymer are used.

6. The process as claimed in claim 1 wherein the monomer mixture to be grafted on consists of a mixture of
I 15 to 80% by weight of said acrylonitrile, methacrylonitrile or mixture thereof,
II 10 to 70% by weight of said at least one aromatic monovinyl compound,
III 5 to 40% by weight of said at least one monoolefin,
IV 0 to 30% by weight of said another vinyl compound, and
V 0 to 15% by weight of said allyl compound.

7. A polymer consisting essentially of an ethylene-vinyl ester having grafted thereon a mixture of acrylonitrile, methacrylonitrile or a mixture thereof, at least one aromatic monovinyl compound, at least one monoolefin containing 2 to 18 carbon atoms, 0–30% by weight of another vinyl compound selected from the group consisting of acrylic acid esters and methacrylic acid esters with 1 to 8 carbon atoms in the alcohol component, acrylamide, methacrylamide, acrylic acid, methacrylic acid, vinyl esters of organic saturated monocarboxylic acids having 2 to 18 carbon atoms and mixtures thereon and 0–15% by weight of an allyl compound selected from the group consisting of allyl alcohol, allyl acetate, isobutene diacetate and mixtures thereof.

8. A polymer consisting essentially of p1 A 9 to 95% by weight of ethylene-vinyl ester copolymer having grafted thereon
B 91 to 5% by weight of a mixture of
I 20 to 85% by weight of acrylonitrile, methacrylonitrile or a mixture thereof,
II 10 to 79.9% by weight of at least one aromatic monovinyl compound,
III 0.1 to 10% by weight of at least one monolefin having 2 to 18 carbon atoms,
IV 0 to 20% by weight of a member selected from the group consisting of acrylic acid esters and methacrylic acid esters with 1 to 8 carbon atoms in the alcohol component, acrylamide, methacrylamide, acrylic acid, methacrylic acid, vinyl esters of organic saturated monocarboxylic acids having 2 to 18 carbon atoms and mixtures thereof and
V 0 to 10% by weight of an allyl compound selected from the group consisting of allyl alcohol, allyl acetate, isobutene diacetate and mixtures thereof.

9. A polymer consisting essentially of
A 40 to 60% by weight of ethylene-vinyl acetate copolymer containing 30 to 75% by weight of built-in vinyl acetate having grafted thereon
B 60 to 40% by weight of a mixture of
I 20 to 85% by weight of acrylonitrile, methacrylonitrile or a mixture thereof,
II 10 to 79.9% by weight of at least one aromatic monovinyl compound,
III 0.1 to 10% by weight of at least one monoolefin having from 2 to 18 carbon atoms,
IV 0 to 20% by weight of at least one vinyl compound selected from the group consisting of acrylic acid esters and methacrylic acid esters with 1 to 8 carbon atoms in the alcohol component, acrylamide, methacrylamide, acrylic acid, methacrylic acid, vinyl esters or organic saturated monocarboxylic acids containing 2 to 18 carbon atoms and mixtures thereof and
V 0 to 10% by weight of at least one allyl compound selected from the group consisting of allyl alcohol, allyl acetate, isobutene diacetate and mixtures thereof.

10. The polymer as claimed in claim 9 wherein A contains 40 to 55% by weight of built-in vinyl acetate.

11. The polymer as claimed in claim 9 wherein I is present in an amount of 20 to 50% by weight, II is present in an amount of 50 to 77% by weight, III is present in an amount of 0.1 to 10% by weight, IV is present in an amount of 0 to 5% by weight and V is present in an amount of 0 to 5% by weight.

* * * * *